United States Patent [19]

Ziegel

[11] 4,391,520
[45] Jul. 5, 1983

[54] TECHNIQUE FOR OPTICAL ALIGNMENT OF A WORKPIECE

[75] Inventor: Douglas H. Ziegel, Indianapolis, Ind.

[73] Assignee: RCA Corporation, New York, N.Y.

[21] Appl. No.: 189,350

[22] Filed: Sep. 22, 1980

[51] Int. Cl.³ ............................................. G01B 11/26
[52] U.S. Cl. ................................................... 356/154
[58] Field of Search ................ 356/138, 150, 154, 155

[56] References Cited

U.S. PATENT DOCUMENTS

| | | | |
|---|---|---|---|
| 1,518,786 | 12/1924 | Griswold | 356/154 |
| 1,736,682 | 11/1929 | Tuckerman | 356/154 |
| 2,150,398 | 3/1939 | Paulson | 356/154 |
| 2,347,702 | 5/1944 | Maris | 356/154 |
| 2,656,762 | 10/1953 | Carr | 356/155 |
| 3,485,561 | 12/1969 | Ewald | 356/154 |
| 3,695,767 | 10/1972 | George et al. | 356/154 |
| 3,951,551 | 4/1976 | MacPherson | 356/155 |

Primary Examiner—R. A. Rosenberger
Attorney, Agent, or Firm—Birgit E. Morris; Donald S. Cohen; Thomas H. Magee

[57] ABSTRACT

A technique for aligning a surface of a workpiece with respect to a positioning ring attached to a holder supporting the workpiece comprises mounting the holder on an alignment platform adjacent a positioning block attached thereto for holding the positioning ring in a predetermined position. The holder is adapted to rotate the workpiece, with respect to the positioning ring, about a first axis, and the alignment platform is supported by a table. The surface of the workpiece is exposed to an incident light beam, whereby the incident beam is reflected from the surface, as a reflected beam, onto a screen along a path of alignment marks disposed thereon. The surface is then rotated about the first axis to change the location where the reflected beam strikes the screen, whereby the surface is properly aligned with respect to the positioning ring when the reflected beam strikes a particular location on the screen.

21 Claims, 4 Drawing Figures

TECHNIQUE FOR OPTICAL ALIGNMENT OF A WORKPIECE

This invention relates to a technique for aligning a surface of a workpiece with respect to a positioning ring attached to a holder supporting the workpiece.

BACKGROUND OF THE INVENTION

Information playback systems frequently utilize a stylus for reading signals from the surface of an information record, typically a plastic disc, that contains stored video and audio information. In some systems the information record has a fine spiral groove to guide the tip of a stylus that contains a thin electrode. In these systems, the stylus tip is made of a material having sufficient hardness to withstand the abrasion caused from tracking the groove. Materials which possess such hardness, for example diamond, generally have a crystallographic structure which presents surfaces exhibiting different qualities depending upon which crystallographic planes the surfaces are oriented along. Consequently, in manufacturing styli from these crystallographic materials for use in video disc playback systems, it is important to known and maintain the tip orientation during the various processing steps in order to achieve uniform styli of high quality.

The stylus tip is typically fabricated from a relatively small stone, e.g., a diamond stone, which is supported in a holder as a workpiece during the processing steps. The orientation of the stylus tip is usually controlled during processing by a positioning ring attached to the holder. The holder is adapted to rotate the tip, with respect to the positioning ring, about an axis, so that a particular surface of the tip may be oriented along a desired plane. The present invention provides a novel method and apparatus for aligning a particular surface of the tip with respect to the positioning ring within an accuracy of about $\pm \frac{1}{2}°$.

SUMMARY OF THE INVENTION

The present invention comprises a technique for aligning a surface of a workpiece with respect to a positioning ring attached to a holder supporting the workpiece. The holder is mounted on an alignment platform adjacent a positioning block attached thereto for holding the positioning ring in a predetermined position. The holder is adapted to rotate the workpiece, with respect to the positioning ring, about a first axis, and the alignment platform is supported by a table. The surface of the workpiece is exposed to an incident light beam, whereby the incident beam is reflected from the surface, as a reflected beam, onto a screen along a path of alignment marks disposed thereon. The surface is then rotated about the first axis to change the location where the reflected beam strikes the screen, whereby the surface is properly aligned with respect to the positioning ring when the reflected beam strikes a particular location on the screen.

DETAILED DESCRIPTION OF THE INVENTION

Figure 1:
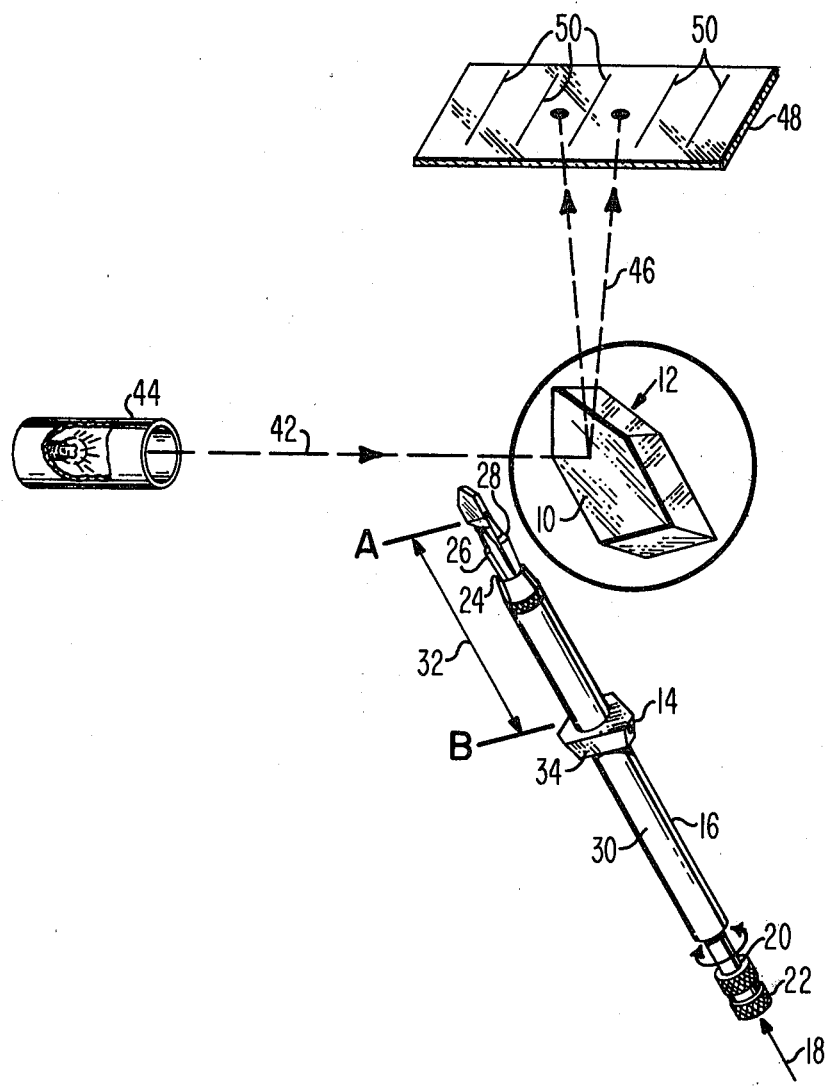
FIG. 1 is a perspective view illustrating the method of the present novel invention.

In FIG. 1 of the drawing, there is illustrated the present novel method wherein a surface 10 of a workpiece 12 is aligned with respect to a positioning ring 14 attached to a holder 16 supporting the workpiece 12. The holder 16 is adapted to rotate the surface 10, with respect to the positioning ring 14, about a first axis taken along the direction of arrow 18. In the present example, the workpiece 12 comprises a stylus tip (enlarged in FIG. 1) fabricated from a natural diamond log, and the surface 10 comprises the surface of a metallic layer disposed adjacent a surface of the log, typically a surface oriented along the (111) crystallographic plane.

The holder 16 may comprise any type of stone-positioning apparatus which has the capability of rotating the surface 10 of the workpiece 12, with respect to the positioning ring 14, about the first axis. The holder 16 shown in FIG. 1 illustrates a pencil for positioning a stone described in U.S. patent application entitled STONE-POSITIONING APPARATUS AND METHOD, Ser. No. 172,758, filed on July 28, 1980, and assigned to RCA Corporation, which is incorporated herein by reference. The holder 16 comprises a shaft 20 having at one end a handle 22 and at the opposite end a split collet 24 having two flexible jaws 26 and 28 for holding the workpiece 12. The collet 24 has a tapered diameter shaped to allow one end of a cylindrical tube 30 to transmit a closing force to the jaws 26 and 28 when the shaft 20 pulls the collet 24 into the one end of the tube 30. By turning the handle 22, the shaft 20 may be frictionally rotated within the tube, so as to allow the surface 10 to be rotated, with respect to the positioning ring 14, about the first axis.

The positioning ring 14 is disposed around the cylindrical tube 30, as shown in FIG. 1. The positioning ring 14 allows the surface 10 of the workpiece 12 to be positioned at location A of a work station by simply placing the ring 14 flush against the surface of a positioning block (not shown in FIG. 1) disposed at location B of the work station, since the surface 10 has already been placed at a predetermined distance from the ring 14, represented by the distance 32 from A to B in FIG. 1. In order to maintain the orientation of the surface 10 along a desired plane, with respect to the first axis, the positioning ring 14 is shaped like a keystone having so-called facet plates for its perimeter, which may be supported along a positioning block at a particular angle in order to achieve the desired orientation of the surface 10 at the work station. In the present embodiment, it is desired to have the electrode surface 10 of the workpiece 12 aligned with a base facet plate 34, which comprises the longest side of the ring 14, as shown in FIG. 1.

Figure 2:
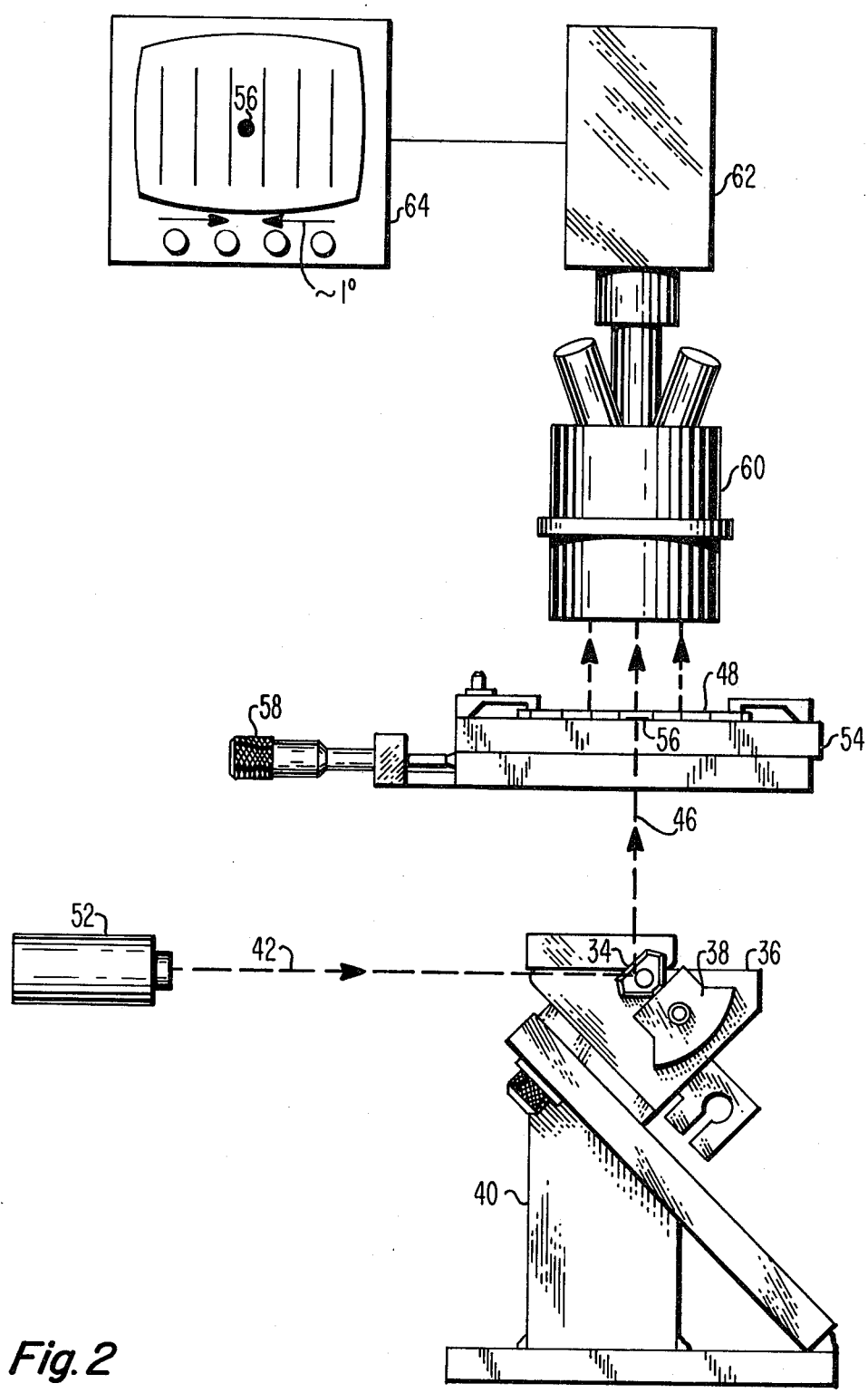
FIG. 2 is a diagrammatic elevation view illustrating the novel apparatus utilized to practice the present novel method.

The first step of the present method comprises mounting the holder 16, which is supporting the workpiece 12, on an alignment platform 36 adjacent a positioning block 38 attached thereto for holding the positioning ring 14 in a predetermined position, as shown in FIG. 2. The alignment platform 36 is supported by a table 40, and is further described below.

As shown in FIG. 1, the surface 10 is now exposed to an incident light beam 42 emanating from a light source 44. The incident beam 42 is reflected from the surface 10, as a reflected beam 46, onto a screen 48 along a path of alignment marks 50 disposed thereon. In the present embodiment, the screen 48 is orthogonal to the plane formed by the incident and reflected beams 42 and 46, and the path of alignment marks 50 is positioned substantially parallel to the incident beam 42, as illustrated in FIG. 1. Preferably, the alignment marks 50 are spaced apart from each other in a manner such that a change in the location where the reflected beam 46 strikes the screen 48, from one mark to an adjacent mark, corresponds to a rotation of the surface 10 about the first axis equaling about 1°.

The surface 10 of the workpiece 12 is then rotated about the first axis to change the location where the reflected beam 46 strikes the screen 48. Since each location where the reflected beam strikes the screen 48 represents a different orientation of the surface 10 with respect to the axis of rotation, the surface 10 may be properly aligned with respect to the positioning ring 14 by having the reflected beam 46 strike a particular location on the screen 48.

In FIG. 2 of the drawing, there is shown the preferred apparatus for performing the above-described method. Although an incandescent lamp will also work, in the present embodiment the light source comprises a laser 52, which is preferred for use on synthetic diamonds which require a more intense light source. Preferably, the screen 48 comprises a transparent plate, such as a glass slide, which is supported in a frame 54 and allows an image 56 formed by the reflected beam 46 on the screen 48 to be visible therethrough. The alignment marks 50 on the screen 48 may be initially positioned by means of an adjustable micrometer 58 disposed adjacent the frame 54 for making small location adjustments thereto. In the present example, a picture of the image 56, together with the alignment marks 50, is transmitted through a triocular microscope 60 and into a television camera 62 connected to a television monitor 64. Since the spacing between the alignment marks 50 is extremely small, the microscope 60 combined with the television monitor 64 enables an operator watching the monitor 64 to easily view the location where the reflected beam 46 strikes the screen 48.

Figure 3:
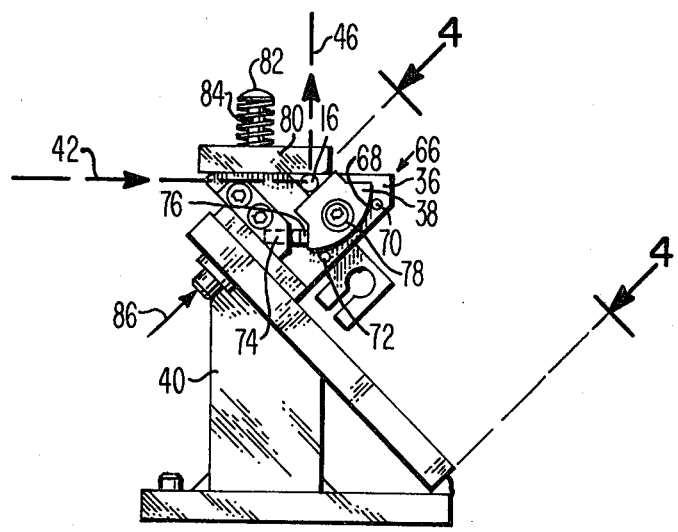
FIG. 3 is an elevation view showing the novel adjusting means of the present apparatus.

In practicing the above-described method, it is important that the surface 10 of the workpiece 12 be positioned initially so that the reflected beam 46 is properly reflected onto the screen 46. In order that the reflected beam 46 strike the screen 48 along the path of alignment marks 50, regardless of the orientation of the surface 10 with respect to the positioning ring 14, the novel apparatus further comprises means for adjusting the positioning block 38 in a manner such that the incident light beam 42 strikes the surface 10 at an angle of between 40° and 50°, preferably about 45°. In FIG. 3 of the drawing, such adjusting means comprises means 66 for revolving the positioning block 38, with respect to the alignment platform 36, about the first axis, which is the axis about which the holder 16 is adapted to rotate the surface 10. In the present embodiment, the revolving means 66 comprises the positioning block 38 having a cylindrical surface 68 opposite the side thereof adapted to mount the holder 16. The cylindrical surface 68 has a center of curvature which coincides with the first axis. Adjacent the cylindrical surface 68 is means for both supporting and guiding the surface 68 along a cylindrical path coinciding with the cylindrical surface 68. In the present embodiment, the supporting and guiding means comprises at least two dowels 70 and 72 adjacent to the cylindrical surface and having the ends thereof attached to the alignment platform 36 so that the longitudinal axes of the dowels 70 and 72 are parallel to the first axis, as shown in FIG. 3.

The present apparatus further comprises a first micrometer-head screw 74 affixed to the alignment platform 36 and having a shaft 76 positioned adjacent the positioning block 38 so that the shaft 76, upon rotation of the screw 74, moves the cylindrical surface 68 of the positioning block 38 a precise distance along the supporting dowels 70 and 72. By having the cylindrical surface 68 move along the supporting dowels 70 and 72, the point on the surface 10, where the incident beam 42 strikes, remains substantially fixed in space. In order words, when the positioning block 38 is adjusted so that the surface 10 is oriented at an angle of about 45°, with respect to the incident beam 42, the incident beam 42 will continue to strike the surface 10. Once the positioning block 38 is adjusted, it may be held in a fixed position, with respect to the alignment platform 36, by tightening a cap screw 78 projecting through a circular groove (not shown) in the positioning block 38 and sunk into the alignment platform 36. It should be emphasized that the novel revolving means 66 achieves rotation of the surface 10 about the first axis without using any conventional bearings or V blocks. The positioning block 38 is typically adjusted as a setup operation at the beginning of the alignment procedure and then, once set, it is locked in place by the cap screw 78 and only checked periodically.

As illustrated in FIG. 3, the holder 16 may be held firmly against the alignment platform 36 by a retaining bar 80, which is affixed to the platform 36 by means of a button-head screw 82 combined with a compression spring 84.

Figure 4:
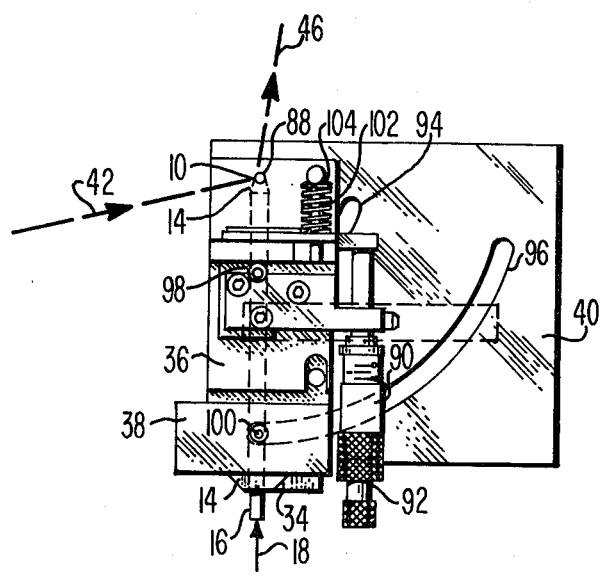
FIG. 4 is a plan view taken along the direction of arrows 4—4 of FIG. 3.

In order to properly position the surface 10 of the workpiece 14 further, the novel adjusting means also comprises means for turning the alignment platform 36, with respect to the table 40, about a second axis, orthogonal to the first axis and lying along the surface 10. In the present example, this second axis is taken along the direction of arrow 86, as shown in FIG. 3. In FIG. 4 of the drawing, the turning means comprises an axle 88, such as a dowel pin, affixed to the table 40 and oriented along the direction 86 of the second axis, on which the alignment platform 36 turns. A second micrometer head screw 90 is affixed to the alignment platform 36 and has a shaft 92 thereof positioned adjacent the platform 36 so that the shaft 92, upon rotation of the screw 90, adjusts the position of the positioning block 38, along the first axis, with respect to the alignment platform 36.

The turning means may also comprise one or more circular grooves 94 and 96 disposed in the table 40, each of the grooves 94 and 96 having a center of curvature coinciding with the second axis, as shown in FIG. 4. Cap screws 98 and 100 project, respectively, through the grooves 94 and 96 in the table 40 along a direction parallel to the second axis and are sunk into the alignment platform 36. The cap screws 98 and 100 not only guide the alignment platform 36 about the second axis but also hold the platform 36 in a fixed position with respect to the table 40, once the alignment platform 36 is turned the desired number of degrees. The turning means may further comprise a compression spring 102 positioned adjacent the alignment platform 36, opposite the second micrometer-head screw 90, by means of a button-head screw 104 affixed to the table 40. The spring 102 is designed to hold the shaft 92 of the second micrometer-head screw 90 firmly against the alignment platform 36.

The present optical alignment apparatus is designed to allow the surface 10 of the workpiece 14 to be quickly and easily aligned with respect to the positioning ring 14. It is emphasized that in actual operation, the novel adjusting means would have to be set only once with respect to a master stylus tip having a specific surface orientation. Then the novel apparatus would be ready to subsequently align a series of stylus tips similar to the master stylus tip having an operator simply turn the handle 22 to rotate the shaft 20 of each holder 16 until the reflected beam 46 strikes the desired location on the screen 48. The present novel apparatus easily aligns a surface of a workpiece, with respect to a positioning ring attached to a holder supporting the workpiece, to within an accuracy of $\pm\frac{1}{2}°$. Since the expanded view of the screen 48 may be easily seen on the monitor 64 by an operator, the present apparatus makes it possible to achieve a high throughput of accurately-aligned diamond styli with a minimum of operator fatigue.

What is claimed is:

1. A method of aligning a surface of a workpiece with respect to a positioning ring attached to a holder supporting said workpiece, said holder adapted to rotate said surface, with respect to said positioning ring, about a first axis, comprising the steps of:
   mounting said holder on an alignment platform adjacent a positioning block attached thereto for holding said positioning ring in a predetermined position, said alignment platform being supported by a table,
   exposing said surface to an incident light beam, whereby said incident beam is reflected from said surface, as a reflected beam, onto a screen along a path of alignment marks disposed thereon,
   revolving said positioning block, with respect to said alignment platform, about said first axis, whereby the point on said surface where said beam strikes remains substantially fixed in space, and
   rotating said surface about said first axis to change the location where said reflected beam strikes said screen, whereby said surface is properly aligned with respect to said positioning ring when said reflected beam strikes a particular location on said screen.

2. A method as recited in claim 1 wherein the step of revolving said positioning block is performed in a manner such that said incident light beam strikes said surface at an angle of between 40° and 50°.

3. A method as recited in claim 2 further comprising the steps of turning said alignment platform, with respect to said table, about a second axis orthogonal to said first axis and lying along said surface.

4. A method as recited in claim 2 wherein said light beam comprises a laser beam and strikes said surface at an angle of approximately 45°.

5. A method as recited in claim 4 wherein said screen is orthogonal to the plane formed by said incident and said reflected beams, and wherein said path of alignment marks is positioned substantially parallel to said incident beam.

6. A method as recited in claim 6 wherein said alignment marks are spaced apart from each other in a manner such that a change in the location where said reflected beam strikes said screen, from one mark to an adjacent mark, corresponds to a rotation of said surface about said first axis equaling about 1°.

7. A method as recited in claim 5 wherein said screen comprises a transparent plate allowing an image formed by said reflected beam on said screen to be visible therethrough, and wherein said method further comprises the step of transmitting a picture of said image, together with said alignment marks, through a microscope and into a television camera connected to a television monitor, whereby the location where said reflected beam strikes said screen may be viewed by an operator watching said monitor.

8. A method as recited in claim 7 wherein said transparent plate comprises a glass slide, wherein said workpiece comprises a stylus tip including a diamond stone, and wherein said surface comprises a surface of a metallic layer disposed adjacent a surface of said diamond stone.

9. Apparatus for aligning a surface of a workpiece with respect to a positioning ring attached to a holder supporting said workpiece, said holder adapted to rotate said surface, with respect to said positioning ring, about a first axis, comprising:
   an alignment platform having a positioning block attached thereto, said block adapted to hold said positioning ring in a predetermined position when said holder is mounted on said platform adjacent said block, said alignment platform being supported by a table,
   a light source positioned so that a beam of light emanating therefrom strikes said surface as an incident beam and is reflected therefrom as a reflected beam,
   a screen having a path of alignment marks thereon, said screen positioned so that said reflected beam strikes said screen along said path, and
   means for revolving said positioning block, with respect to said alignment platform, about said first axis, whereby the point on said surface where said beam strikes may remain substantially fixed in space.

10. An apparatus as defined in claim 9 wherein said revolving means comprises:
    said positioning block having a cylindrical surface opposite the side thereof adapted to mount said holder, said cylindrical surface having a center of curvature coinciding with said first axis, and
    means adjacent said cylindrical surface for both supporting and guiding said surface along a cylindrical path coinciding with said cylindrical surface.

11. An apparatus as defined in claim 10 wherein said supporting and guiding means comprises at least two dowels adjacent to said cylindrical surface and having the ends thereof attached to said alignment platform so that the longitudinal axes thereof are parallel to said first axis.

12. An apparatus as defined in claim 10 further comprising a first micrometer-head screw affixed to said alignment platform and having a shaft positioned adjacent said positioning block so that said shaft, upon rotation of said screw, moves said cylindrical surface of said positioning block along said supporting and guiding means.

13. An apparatus as defined in claim 12 further comprising a cap screw projecting through a circular groove in said positioning block and sunk into said alignment platform, for holding said positioning block in a fixed position with respect to said alignment platform.

14. An apparatus as defined in claim 9 further comprising means for turning said alignment platform, with respect to said table, about a second axis orthogonal to said first axis and lying along said surface.

15. An apparatus as defined in claim 14 wherein said turning means comprises an axle, affixed to said table and oriented along said second axis, on which said alignment platform turns.

16. An apparatus as defined in claim 15 wherein said turning means further comprises:
one or more circular grooves disposed in said table, each of said grooves having a center of curvature coinciding with said second axis, and
cap screws projecting through said grooves in said table along a direction parallel to said second axis and sunk into said alignment platform, for guiding said alignment platform about said second axis and holding said platform in a fixed position with respect to said table.

17. An apparatus as defined in claim 14 wherein said light source comprises a laser, and wherein said incident light beam strikes said surface at an angle of approximately 45°.

18. An apparatus as defined in claim 17 wherein said screen is orthogonal to the plane formed by said incident and said reflected beams, and wherein said path of alignment marks is positioned substantially parallel to said incident beam.

19. An apparatus as defined in claim 18 wherein said alignment marks are spaced apart from each other in a manner such that a change in the location where said reflected beam strikes said screen, from one mark to an adjacent mark, corresponds to a rotation of said surface about said first axis equaling about 1°.

20. An apparatus as defined in claim 18 wherein said screen comprises a glass plate allowing an image formed by said reflected beam on said screen to be transmitted therethrough.

21. An apparatus as defined in claim 20 further comprising a microscope and a television camera positioned so that a picture of said image, together with said alignment marks, is transmitted through said microscope and into said television camera, said television camera being connected to a television monitor, whereby the location where said reflected beam strikes said screen may be viewed by an operator watching said monitor.

* * * * *